US006399206B1

(12) United States Patent
Carswell et al.

(10) Patent No.: US 6,399,206 B1

(45) Date of Patent: Jun. 4, 2002

(54) ELECTROSTATICALLY PAINTED POLYMERS AND A PROCESS FOR MAKING SAME

(75) Inventors: Robert Carswell; Martin C. Cornell, both of Lake Jackson; Cynthia K. Groseth, Brazoria; James R. Porter, Lake Jackson; Ralph D. Priester, Jr., Lake Jackson; Ricky L. Tabor, Lake Jackson, all of TX (US); Melissa J. Zawisza, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 1271 days.

(21) Appl. No.: 08/718,613

(22) Filed: Sep. 24, 1996

Related U.S. Application Data

(63) Continuation of application No. 08/415,819, filed on Apr. 3, 1995, now abandoned, which is a continuation-in-part of application No. 08/118,483, filed on Sep. 8, 1993, now abandoned, which is a continuation-in-part of application No. 07/954,628, filed on Sep. 30, 1992, now abandoned.

(51) Int. Cl.[7] ........................ B32B 27/18; B32B 27/40; H01B 1/20

(52) U.S. Cl. .................................... 428/423.1; 428/704

(58) Field of Search .............................. 428/423.1, 704

(56) References Cited

U.S. PATENT DOCUMENTS

| | | | | |
|---|---|---|---|---|
| 3,151,098 | A | 9/1964 | Watson et al. | |
| 3,403,019 | A | 9/1968 | Stahly et al. | |
| 3,535,294 | A | 10/1970 | Marumo et al. | 260/80.7 |
| 3,956,571 | A | 5/1976 | Takao et al. | |
| 3,996,410 | A | 12/1976 | Gruetzman | |
| 4,026,831 | A | 5/1977 | Moriya et al. | |
| 4,105,594 | A | 8/1978 | Dieterich et al. | |
| 4,147,679 | A | 4/1979 | Scriven et al. | |
| 4,228,194 | A | 10/1980 | Meeder | |
| 4,230,604 | A | 10/1980 | Wingrave | |
| 4,231,901 | A | 11/1980 | Berbeco | |
| 4,301,040 | A | 11/1981 | Berbeco | |
| 4,317,265 | A | 3/1982 | Chase et al. | |
| 4,357,401 | A | 11/1982 | Andre et al. | |
| 4,366,276 | A | 12/1982 | Freitag et al. | |
| 4,395,497 | A | 7/1983 | Naarmann et al. | |
| 4,439,505 | A | 3/1984 | Perlstein et al. | |
| 4,442,160 | A | 4/1984 | Toba et al. | |
| 4,452,727 | A | 6/1984 | Frommer et al. | |
| 4,478,922 | A | 10/1984 | Perlstein et al. | |
| 4,501,686 | A | 2/1985 | Hotta et al. | |
| 4,502,980 | A | 3/1985 | Denisevich, Jr. et al. | |
| 4,505,840 | A | 3/1985 | Kurkov | |
| 4,505,841 | A | 3/1985 | Denisevich, Jr. | |
| 4,505,842 | A | 3/1985 | Kurkov et al. | |
| 4,505,843 | A | 3/1985 | Suzuki et al. | |
| 4,505,844 | A | 3/1985 | Denisevich, Jr. | |
| 4,505,990 | A | 3/1985 | Dasgupta | |
| 4,508,639 | A | 4/1985 | Camps et al. | |
| 4,508,785 | A | 4/1985 | Cobbledick et al. | |
| 4,519,938 | A | 5/1985 | Papir | |
| 4,519,940 | A | 5/1985 | Schroeder et al. | |
| 4,522,745 | A | 6/1985 | Kurkov | |
| 4,534,888 | A | 8/1985 | Cobbledick et al. | |
| 4,540,620 | A | 9/1985 | Johnson et al. | |
| 4,547,270 | A | 10/1985 | Naarmann | |
| 4,560,593 | A | 12/1985 | Naarmann et al. | |
| 4,565,860 | A | 1/1986 | Murofushi et al. | |
| 4,567,250 | A | 1/1986 | Naarmann et al. | |
| 4,568,483 | A | 2/1986 | Naarmann et al. | |
| 4,579,679 | A | 4/1986 | Papir | |
| 4,579,899 | A | 4/1986 | Kondo | |
| 4,582,587 | A | 4/1986 | Hotta et al. | |
| 4,582,781 | A | 4/1986 | Chen et al. | 430/527 |
| 4,587,037 | A | 5/1986 | Munstedt et al. | |
| 4,597,896 | A | 7/1986 | Denisevich, Jr. et al. | |
| 4,610,955 | A | 9/1986 | Chen et al. | |
| 4,613,520 | A | 9/1986 | Dasgupta | |
| 4,617,325 | A | 10/1986 | Knobel et al. | 524/701 |
| 4,618,630 | A | 10/1986 | Knobel et al. | 524/701 |
| 4,620,943 | A | 11/1986 | Denisevich, Jr. et al. | |
| 4,621,106 | A | 11/1986 | Fracalossi et al. | |
| 4,624,801 | A | 11/1986 | Kawaguchi et al. | |
| 4,636,430 | A | 1/1987 | Moehwald | |
| 4,640,748 | A | 2/1987 | Wudl et al. | |
| 4,640,753 | A | 2/1987 | Banks et al. | |
| 4,644,052 | A | 2/1987 | Goel et al. | |
| 4,663,230 | A | 5/1987 | Tennent | |
| 4,678,601 | A | 7/1987 | Ham et al. | |

(List continued on next page.)

FOREIGN PATENT DOCUMENTS

| | | | |
|---|---|---|---|
| EP | 142792 | | 5/1985 |
| EP | 144148 | | 12/1985 |
| EP | 270009 | | 6/1988 |
| EP | 309286 | * | 3/1989 |
| EP | 332122 | | 9/1989 |

(List continued on next page.)

OTHER PUBLICATIONS

Translation of JP 2–166158, Jun. 1990.*

Translation of DE 3322016, Dec. 1984.*

Translation of JP 2–180960, Jul. 1990.*

(List continued on next page.)

*Primary Examiner*—Erma Cameron

(57) ABSTRACT

Polyurethane/polyurea polymers can be electrostatically painted without first being coated with a conductive primer. Disclosed is an improvement in a process for electrostatically painting polyurethane/polyurea polymers, the improvement being to prepare the polymer from a formulation including a non-volatile metal salt conductivity inducing material. The polymers of the present invention can be charged with sufficient charge density to permit efficient paint transfer to the polymer surface. Also disclosed is a composition of at least two adjacent layers, one layer being an outer layer of electrostatically applied paint, and the other an inner layer of polyurethane/polyurea polymer.

12 Claims, No Drawings

U.S. PATENT DOCUMENTS

| | | | | |
|---|---|---|---|---|
| 4,680,236 | A | 7/1987 | Myers et al. | |
| 4,696,835 | A | 9/1987 | Maus et al. | |
| 4,697,000 | A | 9/1987 | Witucki et al. | |
| 4,705,830 | A | 11/1987 | Makishima et al. | |
| 4,719,286 | A | 1/1988 | Matlow | |
| 4,728,673 | A | 3/1988 | Hammer et al. | |
| 4,737,557 | A | 4/1988 | Sato et al. | |
| 4,737,572 | A | 4/1988 | Goel | |
| 4,737,574 | A | 4/1988 | Goel | |
| 4,740,577 | A | 4/1988 | DeVoe et al. | |
| 4,748,192 | A | 5/1988 | Smith | |
| 4,753,717 | A | 6/1988 | Yata et al. | |
| 4,756,787 | A | 7/1988 | Drain et al. | |
| 4,762,644 | A | 8/1988 | Kobayashi et al. | |
| 4,769,115 | A | 9/1988 | Satoh et al. | |
| 4,771,111 | A | 9/1988 | Tieke et al. | |
| 4,778,844 | A | 10/1988 | Blount | |
| 4,795,687 | A | 1/1989 | Suzuki et al. | |
| 4,803,011 | A | 2/1989 | Baraud et al. | |
| 4,806,571 | A | 2/1989 | Knobel et al. | 521/107 |
| 4,830,939 | A | 5/1989 | Lee et al. | |
| 4,832,869 | A | 5/1989 | Cotts | |
| 4,835,076 | A | 5/1989 | Heinze et al. | |
| 4,861,805 | A | 8/1989 | Saavedra et al. | |
| 4,861,806 | A | 8/1989 | Rembold et al. | |
| 4,880,864 | A | 11/1989 | Paul et al. | |
| 4,912,142 | A | 3/1990 | Vermeulen et al. | 524/701 |
| 4,914,150 | A | 4/1990 | Prier | |
| 4,920,167 | A | 4/1990 | Ruetman et al. | 524/155 |
| 4,927,897 | A | 5/1990 | Kawata et al. | |
| 4,931,486 | A | 6/1990 | Myers | |
| 4,939,204 | A | 7/1990 | Efford | 524/701 |
| 4,950,696 | A | 8/1990 | Palazotta et al. | |
| 4,952,612 | A | 8/1990 | Brown-Wensley et al. | |
| 4,978,473 | A | 12/1990 | Kuroda et al. | |
| 4,985,340 | A | 1/1991 | Palazotto et al. | |
| 4,992,559 | A | 2/1991 | Kathirgamanathan et al. | |
| 5,004,801 | A | 4/1991 | Keller et al. | |
| 5,021,473 | A | 6/1991 | Macholdt et al. | |
| 5,024,858 | A | 6/1991 | Burch | |
| 5,055,537 | A | 10/1991 | Kawata et al. | |
| 5,066,731 | A | 11/1991 | Feldhues et al. | |
| 5,071,593 | A | 12/1991 | Takahashi et al. | 252/500 |
| 5,077,330 | A | 12/1991 | Ehrhart et al. | |
| 5,091,439 | A | 2/1992 | Berner et al. | |
| 5,096,761 | A | 3/1992 | Roberts et al. | |
| 5,102,924 | A | 4/1992 | Williams et al. | |
| 5,109,061 | A | 4/1992 | Speranza et al. | |
| 5,110,669 | A | 5/1992 | Knobel et al. | |
| 5,112,529 | A | 5/1992 | Saito | |
| 5,120,778 | A | 6/1992 | Price et al. | |
| 5,122,558 | A | 6/1992 | Knobel et al. | |
| 5,134,177 | A | 7/1992 | Aklonis et al. | |
| 5,137,748 | A | * 8/1992 | Fujiwara et al. | 427/407.1 |
| 5,140,056 | A | 8/1992 | Wiskamp et al. | |
| 5,147,900 | A | 9/1992 | Palazotta et al. | |
| 5,156,915 | A | 10/1992 | Wilson et al. | |
| 5,157,062 | A | 10/1992 | Koyama et al. | |
| 5,174,923 | A | 12/1992 | Chen et al. | |
| 5,188,783 | A | 2/1993 | Pierce | |
| 5,190,988 | A | 3/1993 | Aoki et al. | |
| 5,194,182 | A | 3/1993 | Kissel | |
| 5,198,153 | A | 3/1993 | Angelopoulos et al. | |
| 5,198,521 | A | 3/1993 | Ehrhart et al. | |
| 5,202,009 | A | 4/1993 | Andrieu et al. | |
| 5,204,397 | A | * 4/1993 | Maki et al. | 524/401 |
| 5,236,983 | A | 8/1993 | Hegedus et al. | |
| 5,238,744 | A | 8/1993 | Williams et al. | |
| 5,238,758 | A | 8/1993 | Lee et al. | |
| 5,252,546 | A | 10/1993 | Ueba et al. | |
| 5,286,414 | A | 2/1994 | Kampf et al. | |
| 5,290,483 | A | 3/1994 | Kulkarni et al. | |
| 5,290,599 | A | 3/1994 | Hegedus et al. | |
| 5,290,839 | A | 3/1994 | Hegedus et al. | |
| 5,290,840 | A | 3/1994 | Hegedus et al. | |

FOREIGN PATENT DOCUMENTS

| | | |
|---|---|---|
| EP | 333146 | 9/1989 |
| EP | 353932 | 2/1990 |
| EP | 363103 | 4/1990 |
| EP | 0 475 360 | 3/1992 |
| EP | 528178 | 2/1993 |
| EP | 565237 | 10/1993 |
| JP | H1319697 | 12/1989 |
| JP | H2180960 | 7/1990 |
| WO | 9101621 | 2/1991 |
| WO | 9113444 | * 9/1991 |
| WO | 93/24292 | 12/1993 |

OTHER PUBLICATIONS

CA + Derwent Abstracts of JP 02–166158, Jun. 1990.*
CA + Derwent Abstracts of DE 3322016, Dec. 1984.*
CA, Derwent + Japio Abstracts of JP 02–180960, Jul. 1990.*
Alaa A. Elmoursi, *1989 IEEE Industry Applications Society Annual Meeting*, Part II, "Electrical Characterization of Bell–Type Electrostactic Painting Systems", pp. 2043–2051, (1989).
Catherine A. Behringer, *Manufacturing Engineering*, "Electostatic Spray Finishing Has Firm Hold in Industry", pp. 44–47, (Jun. 1986).
Garner et al., *Journal of Coatings Technology*, vol. 63, No. 803, "Electrostatic Painting of Plastics I: Electrical Properties of Plastics and Primers", pp. 33–38, (Dec. 1991).
Elmoursi et al., *Journal of Coatings Technology*, vol. 64, No. 805, "Electrostatic Painting of Plastics II: Electric Field Effects", pp. 39–44, (Feb. 1992).
Elmouri et al., *IEEE Transactions on Industry Applications*, vol. 27, No. 2, "Electrical Characterization of a Charged Workpiece Grounded–Sprayer Electrostatic Painting System", pp. 311–315, (Mar./Apr. 1991).
Japan Abstract 4–1241, Jan. 1992.
Japan Abstract 59–215366, Dec. 1984.
Japan Abstract 63–51472, Mar. 1988.
Japan Abstract 63–197571, Aug. 1988.
DD 269 392, Jun. 1989.
German Abstract 3322016, Dec. 1984.
Japan Abstract 63–101444, May 1988.
Japan Abstract 1–178554, Jul. 1989.
Japan Abstract 135545 (Oct. 1981).
Japan Abstract 135546 (Oct. 1981).
Japan Abstract 2–166158 Jun. 1990.
Derwent Abstract, 85–076936/13, Feb. 1985, JP 60–028403.
Derwent Abstract, 85–122465/20, May 1985, WO 85/01947.
Derwent Abstract 87–357058/51, Dec. 1987, EP 250364.
Derwent Abstract 89–019734/03, Dec. 1988, JP 63–295667.
Derwent Abstract 89–070335/10, Mar. 1989, EP 306162.
Derwent Abstract 90–147828/19, Apr. 1990, WO 90/03988.
Derwent Abstract 90–236682/31, Jun. 1990, JP 2–166158.
Derwent Abstract 91–158427/22, Apr. 1991, JP 3–091566.
Derwent Abstract 93–322460/41, Oct. 1993, EP 565237.

* cited by examiner

ELECTROSTATICALLY PAINTED POLYMERS AND A PROCESS FOR MAKING SAME

CROSS-REFERENCE TO RELATED APPLICATION

This is a continuation of application Ser. No. 08/415,819, filed Apr. 3, 1995, now abandoned.

This application is a Continuation-In-Part of U.S. Ser. No. 08/118,483, filed Sep. 8, 1993, entitled ELECTROSTATICALLY PAINTED POLYMERS AND A PROCESS FOR MAKING SAME, which is now abandoned; which is a Continuation-In-Part of U.S. Ser. No. 07/954,628, filed Sep. 30, 1992, entitled ELECTROSTATICALLY PAINTED POLYURETHANE AND/OR POLYUREA POLYMERS AND A METHOD FOR MAKING SAME, which is now abandoned.

BACKGROUND OF THE INVENTION

This invention relates to a process for electrostatically painting polymers. This invention particularly relates to electrostatically painting polymers having urethane or urea groups.

It is well known that most painting methods are unlikely to be 100 percent efficient. For example, when paint is applied to an object as a spray, some fraction of the paint directed at the object may not be deposited on the object. In even more inefficient circumstances, the paint and the object can acquire a static charge of the same polarity resulting in the paint being partially repelled from the object. Another painting inefficiency commonly observed is that the paint layer on a painted object can be of inconsistent thickness. Yet another painting inefficiency commonly observed, particularly in spray painting objects having complex shapes, is that paint can tend to travel from a spraying apparatus to the object to be painted in a relatively straight line and may not cover surfaces not directly accessible to the spraying apparatus.

In painting applications requiring a very high quality paint finish, such as in the painting of automobile body parts, it is generally desirable to completely and evenly coat an object to be painted with a minimum expenditure of paint. This is desirable for several reasons. First, paint for such applications is often very expensive. Therefore, reducing paint consumption offers the immediate benefit of reduced paint cost. Second, paint which is not deposited upon the object to be painted can be lost to the environment and this loss can be environmentally undesirable. Therefore, reducing the quantity of paint lost to the environment in a painting process reduces the costs of disposing of the lost paint solids and reduces emissions of paint solvents. Third, while the layer of paint being slightly too thick on an object can sometimes be tolerated, the paint layer being too thin more often cannot. Besides improving the appearance of an object, modern paints often play a vital role in protecting a painted object from its environment. For example, paint can protect a metal object from corrosion or protect a plastic object from degradation by ultraviolet radiation. Therefore, failures of painted objects due to areas of too thin paint on the objects can be avoided by applying paint to objects wherein the layer of paint is of a consistent and sufficient thickness.

In order to minimize problems with inefficient painting, it is common practice in painting some materials to apply paint electrostatically. In electrostatic painting, a static electric potential is generated between paint and an object to be painted causing the paint to be attracted to the object. As a result of the electrostatic attraction, less paint can be lost to the environment and the paint can be more evenly applied to the object without the entire surface being directly accessible to the paint spraying apparatus.

But electrostatically painting objects is not always trouble free. In order to electrostatically paint an object, an electric charge potential must be generated between both the object to be painted and a paint to be applied to the object. If an object is either not conductive or of very low conductivity, it cannot be efficiently electrostatically charged and cannot, therefore, be efficiently electrostatically painted.

One means of electrostatically painting polymers is to first make them more conductive by preparing the polymers from formulations including conductive fillers. European Patent Application 0 363 103 to Suzuki, et al., discloses preparing a thermoplastic polymer having 2 to 50 percent by weight of a fibrous conductive filler such as carbon fibers, metallic fibers, metalized glass fibers, metal coated carbon fibers and conductive potassium titanate whiskers. The polymer is etched and then electrostatically painted. However, adding such large amounts of fibrous fillers to a polymer can adversely affect both the polymer's physical properties and paint finish. A separate etching step can also be undesirable.

JP II 2-180960 assigned to Kanto Auto Works discloses preparing polyurethane substrates having improved conductivity. The polyurethanes of this reference are prepared with ammonium salts such as n-alkyldimethyl ammonium sulphates. One problem with such additives are that they promote conductivity only when humidified. This could be a problem in a painting application located in a region wherein the ambient humidity is not constant. Alternatively, deliberately humidifying articles prior to electrostatically painting them could be time consuming and expensive.

Another means of electrostatically painting polymers is to first make them more conductive by applying thereto conductive agents called "prepcoats".These prepcoats are conductive agents which adhere to the surface of the polymer. Such agents can include materials such as quaternary amines. One problem with such compounds is that they are often hydrophilic. In reaction injection molding (RIM) polyurethanes, adsorbed water can cause blemishes on the surfaces of the polymer. Hydrophilic coatings can aggravate the tendency of objects to adsorb water prior to painting, thus promoting the formation of blemishes and thereby be undesirable in applications requiring high quality finishes.

Yet another solution to the problem of electrostatically painting plastics is to first coat a plastic object with a conductive coating, and then to electrostatically paint the coated object. For example, U.S. Pat. No. 5,071,593 to Takahashi, et. al., discloses coating problematic plastics such as polyacetal and polyesters with a conductive agent prior to electrostatic painting. However, coating an object with a conductive agent can be inefficient. It requires a capital expenditure for additional painting equipment, additional processing time to apply the conductive agent, additional processing time to allow the conductive agent to cure and expenditures for the cost of the conductive agent.

It is known in the art that polymers, particularly reaction injection molded polyurethane/polyurea polymers, are useful materials for preparing automobile parts such as, for example, fascia and interior and exterior panels. In order to paint articles prepared from such polymers and produce a high quality paint finish, as is required in modern automobile manufacturing practices, it is known to electrostatically paint these articles after first applying a conductive primer thereto. Known processes for electrostatically painting polymer articles include at least the steps of: (1) preparing an object to be painted from a polyurethane/polyurea polymer formulation; (2) coating the object with a conductive agent (or conductive primer); (3) applying an electric charge of a first polarity to a paint; (4) applying an electric charge of second and opposite polarity to the object (or merely charging either the paint or the article relative to ground while leaving the other neutral to ground); and (5) discharging the paint from a painting apparatus onto the object.

It would be desirable in the art to efficiently electrostatically paint polymers without having to pretreat the polymer by priming or prep-coating the polymer with a conductive material. It would also be desirable in the art to more efficiently electrostatically paint a polymer which has been primed or prepcoated with a conductive substance. It would be desirable in the art to prepare a polymer with sufficient native conductivity to efficiently electrostatically paint the polymer. It would be desirable in the art that the polymer to be painted not require special treatment such as humidification. And it would also be desirable in the art that the painted polymer have a sufficiently high quality painted surface and sufficiently strong physical properties such that the polymer could be used in very demanding applications such as the manufacture of automobiles. Finally, it would be desirable in the art if objects of dissimilar composition, e.g., metal and plastic, can be painted as a unit rather than painted separately and then joined together.

SUMMARY OF THE INVENTION

In one aspect, the present invention is a process for electrostatically painting cured urea polymers and/or urethane group containing polymers comprising the steps of: (A) preparing a cured polymer from a polymer formulation including a (1) materials which include or form urea groups, urethane groups or mixtures thereof, and (2) a non-volatile metal salt conductivity including material, and (B) electrostatically painting the polymer wherein (a) the polymer can be efficiently electrostatically painted, and (b) the polymer would not be conductive but for the inclusion of the non-volatile metal salt conductivity inducing materials of the present invention.

Still another aspect of the present invention is an electrostatically painted object comprising at least two layers, a first layer being a layer of polymer prepared from a polymer formulation including (1) materials which include or form urea groups, urethane groups or mixtures thereof, and (2) a non-volatile metal salt conductivity inducing material, and a second layer, the second layer being a layer of electrostatically applied paint, wherein (a) the polymer can be efficiently electrostatically painted, and (b) the polymer would not be conductive but for the inclusion of the non-volatile metal salt conductivity inducing materials in the polymer.

DESCRIPTION OF THE PREFERRED EMBODIMENTS

The present invention is an improvement to known processes for electrostatically painting polymers. This improvement includes preparing an object to be painted from a polymer formulation including (1) materials which include or form urea and/or urethane groups and (2) a non-volatile metal salt a conductivity inducing material. The resultant polymers can be electrostatically painted without the use of a conductive primer, prep-coat and the like.

In the process of the present invention, a cured polymer is painted. For the purposes of the present invention, a cured polymer is one wherein the reaction to produce the polymer is substantially complete and the polymer is in a solid and preferably fixed shape. Even more preferably, the polymer is in a shape appropriate for painting. For example, the polymer can be in the shape of an automobile body panel, side cladding or fascia.

The conductivity inducing materials of the present invention are non-volatile metal salts. As a salt the conductivity inducing materials of the present invention will have both a cation and an anion. The cation of the salts can be a cation of any metal which forms an ionizable salt with one or more anions, including Li, Be, Na, Mg, Al, K, Ca, Ga, Ge, Cu, Zn, Sc, Ti, V, Cr, Mn, Fe, Co, Ni, Rb, Sr, In, Sn, Sb, Y, Zr, Nb, Mo Tc, Ru, Rh, Pd, Ag, Cd, Cs, Ba, Tl, Pb, Bi, Po, Hf, Ta, W, Re, Os, Ir, Pt, Au, Hg, Fr, Ra and the Lanthanide series of the Periodic Table of the Elements. Preferably, the cation is a cation of alkali metal (Li, Na, K, Rb, Cs, Fr), an alkaline earth metal (Ca, Ba, Sr, Ra), Co, Ni, Fe, Cu, Cd, Zn, Sn, Al or Ag; more preferably the cation is a cation of an alkaline earth or alkali metal; even more preferably the cation is a monovalent cation, especially an alkali metal cation; and most preferably the cation is a cation of Li, Na, K or mixtures thereof. The non-volatile metal salt cations of the present invention can be selected from the group consisting of cations of Li, Na, K and mixtures thereof.

The non-volatile metal salt conductivity inducing materials of the present invention are salts of certain anions with the cations described above. One group of preferred non-volatile metal salts are fluoroalkyl sulfonic acid salts. The fluoroalkyl sulfonic acid anion (fluoroalkyl sulfonate) is suitably any fluoroalkyl sulfonic acid anion compatible with a specific composition in which it is used. Preferred fluoroalkyl sulfonates have from about one to about twenty carbon atoms and are either straight chained, branched or cyclic. Fluoroalkyl sulfonates are sulfonate anions having an alkyl group having fluorine substitution, that is, fluorine atoms bonded to the carbon atoms of the alkyl groups. The alkyl groups, optionally, also have hydrogen atoms and/or other halogen atoms bonded to the carbon atoms. Preferably, at least about 25 percent, more preferably about 75 percent, (by number) of the atoms other than carbon which are bonded to carbon atoms of the fluoroalkyl groups are halogen, preferably fluorine. More preferably, the fluoroalkyl groups have complete halogen substitution. Suitable halogens include fluorine, chlorine, bromine and iodine, preferably fluorine and chlorine. Suitable perhaloalkly sulfonic acid anions include, for instance, $C_2H_2F_3SO_3^-$ (tresylate), $C_2HF_4SO_3^-$, $C_2HClF_3SO_3^-$, $C_3H_2F_5SO_3^-$, $C_4C_2C_7SO_3^-$, $C_5H_2F_9SO_3^-$, $C_7ClF_{14}SO_3^-$, $C_8Cl_2H_2F_{13}SO_3^-$, $C_{20}ClHF_{39}SO_3^-$ and the like.

The fluoroalkyl groups are most preferably perfluoroalkyl groups. Exemplary perfluoroalkyl sulfonic acid anions include, for example $CF_3SO_3^-$(triflate), $C_2F_5SO_3^-$, $C_3F_7SO_3^-$, $C_4F_9SO_3^-$(nonaflate), $C_5F_{11}SO_3^-$, $C_6F_{13}SO_3^-$, $C_7F_{15}SO_3^-$, $C_8F_{17}SO_3^-$, $C_9F_{19}SO_3^-$, $C/_{20}F_{41}SO_3^-$ and the like, isomers thereof and mixtures thereof. The salts of perfluoroalkyl sulfonates preferably have from about 1 to about 20, more preferably from about 1 to about 10, carbon atoms for reasons of availability and compatibility with polymers.

Other non-volatile metal salts can be used as conductivity inducing materials to prepare the formulations of the present invention also. The anion of such salts is recognizable by those skilled in the art by such characteristics as pi bonding, electron withdrawing groups such as halogen atoms, the possibility of resonance structures and the like. The anion is preferably a relatively large, multiatomic anion having substituents like phenyl groups, sulfur atoms, phosphorus atoms and the like that can accept and delocalize an electron charge; more preferably the anion has more than one, more preferably at least about 4, most preferably at least about 5, non-metallic atoms.

Non-metallic atoms are generally considered to be selected from the group consisting of boron, carbon, silicon, phosphorus, arsenic, oxygen, sulfur, selenium, tellarium, fluorine, chlorine, bromine, iodine and astatine. Preferred non-metallic atoms are boron, phosphorus, sulfur, fluorine, and carbon in aromatic groups; sulfur, phosphorus and carbon in aromatic groups are more preferred. The anion is preferably monovalent. The anion is more preferably the conjugate base of an inorganic acid having one or more delocalizable electrons, e.g., a fluoroalkyl sulfonate or a tetraorganoboron ion. Such anions include, for example, $NO_3^-$, $SCN^-$, $SO_4^{2-}$, $HSO_4^-$, $SO_3^{2-}$, $HSO_3^-$, $CNSO_3^-$, $XSO_3^-$ wherein X is a halogen, $SXSO_3^-$ wherein X is a hydrogen or an anion, $ClO_4^-$, $PO_4^{3-}$, $H_2PO_4^-$, $HPO_4^{2-}$, $PO_3^{3-}$, $HPO_3^{2-}$, $H_2PO^{3-}$, particularly tetraalkyl and tetraarylboron ions and non-alkyl or non-aryl substituted sulfonic ions, and the like.

For the purposes of the present invention, the term non-volatile metal salt is further defined to exclude those salts which are incompatible with or undesirable in formulations for polymers having urethane and/or urea groups. For example, the anion of a non-volatile metal salt of the present invention is not an SCN- anion because the salts of these anions can cause handling problems due to viscosity growth in polyurea formulations. SCN- anions are also known to be water extractable in some polyurethane formulations. This property can cause handling problems in some painting applications. In contrast, non-volatile metal salts having good compatibility with formulations for polymers having urethane and/or urea groups are included and are preferred. For example, tetraphenylboron and hexfluorophosphate anions are particularly preferred as conductivity inducing materials for the present invention because of their good compatibility and handling properties. Mixtures of the non-volatile metal salts of the present invention can also be used to practice the present invention. Most preferably, the non-volatile metal salts of the present invention are salts wherein the non-volatile metal salt anion is selected from the group consisting of a perfluoroalkyl sulfonate, a hexafluorophosphate anion, or mixtures thereof.

The amount of conductivity inducing material which will be included in the polyurethane/polyurea formulations of the present invention will vary with the polymer. In the practice of the present invention, sufficient conductivity enhancing material is included in the formulation to render the material sufficiently conductive to allow efficient electrostatic painting. A polymer which is comparatively non-conductive can require more conductivity inducing material than a polymer which is comparatively more conductive.

"However, generally, the amount of conductivity inducing material added to a polymer formulation useful for preparing polyurethane/polyurea polymers to be electrostatically painted is preferably from about 0.02 percent to about 1.5 percent, more preferably from about 0.05 percent to about 1.0 percent and even more preferably from about 0.10 to about 0.75 percent by weight based on the total polymer weight."

The non-volatile metal salt conductivity inducing materials of the present invention are preferably those which, when included in a polymer formulation, result in a polymer which has physical properties substantially similar to those of otherwise identical polymers prepared without the non-volatile metal salt conductivity inducing materials. The physical properties relevant to this are those properties which determine if the polymer is useful in the application for which it is intended. For example, one such property is aesthetic appearance. If a non-volatile metal salt produces an undesirable appearance in a polymer at the minimum concentration necessary to efficiently paint the polymer, it is not a preferred conductivity inducing material of the present invention. Other physical properties often useful in determining if a polymer is useful in applications wherein electrostatic painting is often done include: flex modulus, tear strength and tensile strength. For the purpose of the present invention, two polymers have substantially similar physical properties if the values for those properties are within 15 percent, preferably within 12 percent, and most preferably within 10 percent of each other. In some cases, the non-volatile metal salts of the present invention can interact with the polymers they are incorporated into to actually improve some polymer physical properties.

The polymers of the present invention can be electrostatically painted with about the same efficiency as a steel control painted under similar conditions. The efficiency of the painting process is determined by measuring the amount of paint deposited onto the object during the electrostatic painting process. For the purposes of the present invention, the term "efficiently electrostatically painted" is defined as the condition wherein about the same thickness of paint is deposited upon a polymer object as is deposited upon a steel object when electrostatically painted under the same of substantially similar conditions.

The process of the present invention can be used with polymers that would not be conductive but for the inclusion of the non-volatile metal salt conductivity inducing materials of the present invention. For the purposes of the present invention, the term "conductive" is defined as having sufficient electrical conductivity to be efficiently electrostatically painted. The term "efficiently electrostatically painted" is used as defined in the paragraph immediately before.

The polymers of the present invention have urea groups, urethane groups and mixtures thereof. That is the polymers can be prepared from materials which include or react to form only polyurethane or polyurea groups, or the polymers of the present invention can be prepared from materials which include or react to form both polyurethane and polyurea groups. Other polymer linkages can be formed in the practice of the present invention too. For example, a polymer having polyurethane, polyurea and isocyanurate groups can be prepared.

The polymers of the present invention can also be polymer blends and polymer interpenetrating network polymers. For example, a polyurethane of the present invention can be blended with another polymer such as, for example, an acrylonitrile-butadiene-styrene polymer and then be electrostatically painted. Other blendable polymers useful with the present invention include but are not limited to nylon, polyethyl terephthalate and polyacrylate. Interpenetrating network polymers can be prepared with polymers of the present invention with materials such as epoxy resins and polycarbonate resins. The network polymers can be prepared by including one or more monomers in the formulations of the present invention such that the materials form a co-continuous or phase segregated in-situ polymer network. Preferably, the urea/urethane group containing polymers are the predominant component of multipolymer compositions of the present invention.

The polymers of the present invention can be either thermoplastic or thermoset. Polyurethanes are prepared from formulations including both a polyisocyanate and a polyalcohol. Polyureas are prepared from formulations including both a polyisocyanate and a polyamine. The polyurethane/polyurea polymers are often prepared from formulations including a polyisocyanate and both a polyalcohol and a polyamine.

In the practice of the present invention, the polyisocyanate formulation component can be advantageously selected from organic polyisocyanates, modified polyisocyanates, isocyanate-based prepolymers, and mixtures thereof. These can include aliphatic and cycloaliphatic isocyanates, but aromatic and especially multifunctional aromatic isocyanates are preferred. "Preferred are: 2,4- and 2,6-toluenediisocyanate and the corresponding isomeric mixtures; MDI (4,4'-, 2,4'- and 2,2'-diphenylmethanediisocyanate and the corresponding isomeric mixtures); (mixtures of 4,4'-, 2,4'- and 2,2'-diphenylmethanediisocyanates and polyphenyl polymethylene polyisocyanates (PMDI); and mixtures of PMDI and toluene diisocyanate (TDI)." Also useful with the present invention are aliphatic and cycloaliphatic isocyanate compounds such as 1,6-hexamethylenediisocyanate; 1-isocyanato-3,5,5-trimethyl-1-3-isocyanatomethyl-cyclohexane; 2,4- and 2,6-hexahydrotoluenediisocyanate, as well as the corresponding isomeric mixtures; 4,4'-, 2,2'- and 2,4'-dicyclohexylmethanediisocyanate, as well as the corresponding isomeric mixtures.

Also advantageously used for the polyisocyanate component are the so-called modified multifunctional isocyanates, i.e., products which are obtained through chemical reactions of the above diisocyanates and/or polyisocyanates. Exemplary are polyisocyanates containing esters, ureas, biurets, allophanates and preferably carbodiimides and/or uretonimine; isocyanurate and/or urethane group containing diisocyanates or polyisocyanates. Liquid polyisocyanates containing carbodiimide groups, uretonimine groups and/or isocyanurate rings, having isocyanate groups (NCO) contents of from 10 to 40 weight percent, more preferably from 20 to 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures, 4,4'-, 2,4'- and 2,2'-diphenylmethane diisocyanate and the corresponding isomeric mixtures; mixtures of diphenylmethane diisocyanates and PMDI and mixtures of toluene diisocyanates and PMDI and/or diphenylmethane diisocyanates.

Suitable also are prepolymers having NCO contents of from 5 to 40 weight percent, more preferably from 15 to 30 weight percent. These prepolymers are prepared by reaction of the di- and/or polyisocyanates with materials including diols, triols, but also they can be prepared with multivalent active hydrogen compounds such as di- and tri-amines and di- and tri-thiols. Individual examples are aromatic polyisocyanates containing urethane groups, preferably having NCO contents of from about 5 to about 40 weight percent, more preferably about 20 to 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Particularly useful in the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from 20 to 35 weight percent, based on the weight of the prepolymer, prepared by the reaction of polyoxyalkylene polyols, having a functionality of preferably from 2 to 4 and a molecular weight of from about 800 to about 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluenediisocyanate and the corresponding isomeric mixtures. PMDI in any of its forms can also be used and is preferred. In this case it preferably has an equivalent weight between about 125 and about 300, more preferably from about 130 to about 175, and an average functionality of greater than about 2. More preferred is an average functionality of from about 2.5 to about 3.5. The viscosity of the polyisocyanate component is preferably from about 25 to about 5,000 centipoise (cps) (about 0.025 to about 5 Pa·s), but values from about 100 to about 1,000 cps (about 0.1 to about 1 Pa·s)at 25° C. are preferred for ease of processing. Similar viscosities are preferred where alternative polyisocyanate components are selected.

In the practice of the present invention, a polyalchohol formulation component can be advantageously selected from the following classes of compositions, alone or in admixture: (a) alkylene oxide adducts of polyhydroxy alkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols".Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also preferred are poly(oxypropylene) glycols, triols, tetrols, pentols and hexols and any of these that are capped with ethylene oxide. These polyols also include poly(oxypropyleneoxyethylene)polyols. The oxyethylene content should preferably comprise less than about 80 weight percent of the total and more preferably less than about 40 weight percent. Ethylene oxide, when used, can be incorporated in any way along the polymer chain, for example, as internal blocks, terminal blocks, or randomly distributed blocks, or any combination thereof.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

Polyisocyanate polyaddition active hydrogen containing compounds (PIPA) are also useful for preparing formulations of the present invention. PIPA compounds are typically the reaction products of TDI and triethanolamine. A method for preparing PIPA compounds can be found in, for example, U.S. Pat. No. 4,374,209, issued to Rowlands. Polyester polyols can be used for preparing the polymers of the present invention. For example, polyols prepared from caprolactone are useful. Polyols prepared from butanediol and adipic acid can also be used. Any polyester known to one skilled in the art of preparing polyurethanes and polyureas to be useful can be used with the present invention.

Low molecular weight diols and triols can also be used in preparing the polymers of the present invention. Ethylene glycol is particularly useful but other, similar compounds can also be used. Propylene glycol, diethylene glycol, are also suitable for use in the present invention.

In the practice of the present invention, the polyamine formulation component can be selected from the group including and polyamines, and amineterminated polyols. Polyamines are preferred for preparing the polyurethane/polyurea formulations of the present invention include the known low molecular isocyanate-reactive compounds such as aromatic polyamines, especially diamines, having molecular weights of less than about 800, preferably less than about 500.

Preferred amine group containing compounds include the sterically hindered aromatic diamines which contain at least one linear or branched alkyl substituent in the ortho position to the first amino group and at least[]one, preferably two, linear or branched alkyl substituents containing at least one, preferably one to three carbon atoms in the ortho position to the second amino group. These aromatic diamines include 1-methyl-3,5-diethyl-2,4-diaminobenzene, 1-methyl-3,5-diethyl-2,6-diaminobenzene, 1,3,5-trimethyl-2,4-diaminobenzene, 1-methyl-5-t-butyl-2,4-diaminobenzene, 1-methyl-5-t-butyl-2,6 diaminobenzene, 1,3,5-triethyl-2,4-diaminobenzene, 1-methyl-5-t-butyl-2,4-diaminobenzene, 1-methyl-5-t-butyl-2,6-diaminobenzene, 1,3,5-triethyl-2,4-diaminobenzene, 3,5,3', 5'-tetraethyl-4,4'-diaminodiphenylmethane, 3,5,3', 5'-tetraisopropyl-4,4'-diaminodiphenylmethane, 3,5-diethyl-3', 5'-diisopropyl-4,4'-diaminodiphenylmethane, 3,3'-diethyl-5,5'-diisopropyl-4,4'-diaminodiphenylmethane, 1-methyl-2,6- diamino-4-isopropyibenzene and mixtures of the above diamines. Most preferred are mixtures of 1-methyl-3,5-diethyl-2,4-diaminobenzene and 1-methyl-3,5-diethyl-2,6-diaminobenzene in a weight ratio between about 50:50 to 85:15, preferably about 65:35 to 80:20.

Unhindered aromatic polyamines can be used with the sterically hindered chain extenders and include 2,4-and/or 2,6-diaminotoluene, 2,4' and/or 4,4'-diaminodiphenylmethane, 1,2'- and 1,4-phenylene diamine, naphthalene-1,5-diamine and triphenyl methane -4,4', 4"-triamine. The difunctional and polyfunctional aromatic amine compounds may also exclusively or partly contain secondary amino groups such as 4,4'-di-(methylamino)-diphenylmethane or 1-methyl-2-methylamino-4-Aminobenzene. Liquid mixtures of polyphenyl polymethylene polyamines of the type obtained by condensing aniline with formaldehyde are also suitable.

Generally the nonsterically hindered aromatic diamines and polyamines are too reactive to provide sufficient processing time in preparing polymers such as RIM polyurethanes and polyureas. Accordingly, these diamines and polyamines should be used in combination with one or more of the previously mentioned sterically hindered diamines. One exception to this is the case of methylene diorthochloroaniline. This particular diamine, though not sterically hindered, is a suitable material for preparing RIM polyurethane/polyureas.

Polyurethane catalysts are also suitably used with the present invention. The catalyst is preferably incorporated in the formulation in an amount suitable to increase the rate of reaction between the isocyanate groups of the composition of the present invention and a hydroxyl-reacting species. Although a wide variety of materials is known to be useful for this purpose, the most widely used and preferred catalysts are the tertiary amine catalysts and the organotin catalysts.

Examples of the tertiary amine catalysts include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethyl aminopropylamine, dimethylbenzyl amine and the like. Tertiary amine catalysts are advantageously employed in an amount from about 0.01 to about 2 percent by weight of the polyol formulation.

Examples of organotin catalysts include dimethyltin dilaurate, dibutyltin dilaurate, dioctyltin dilaurate, stannous octoate and the like. Other examples of effective catalysts include those taught in, for example, U.S. Pat. No. 2,846,408. Preferably the organotin catalyst is employed in an amount from about 0.001 to about 0.5 percent by weight of the polyol formulation.

Catalysts which promote the formation of isocyanurate groups can also be used with the present invention. Suitable catalysts for use with the present invention include such as those mentioned in Saunders and Frisch, *Polyurethanes, Chemistry and Technology* in "1 *High Polymers*" Vol. XVI, pp. 94–97 (1962). Such catalysts are referred to herein as trimerization catalysts. Examples of these catalysts include aliphatic and aromatic tertiary amine compounds, organometallic compounds, alkali metal salts of carboxylic acids, phenols and symmetrical triazine derivatives. Preferred trimerization catalysts are potassium salts of carboxylic acids such as potassium octoate and tertiary amines such as, for instance, 2,4,6-tris(dimethyl aminomethyl) phenol.

The process of the present invention can include an additional step wherein the polymer is formed into an article prior to painting it. RIM, as already discussed above is a preferred method of preparing an article. Injection molding of thermoplastics is also a preferred means of preparing an article. Polymer casting can also be practiced with the process of the present invention as well as blow molding, extrusion and compression molding. One advantage of the present invention is that articles so formed can be attached to metal articles and the two painted together as a unit.

In addition to the above formulations components, the polyurethane/polyurea formulations of the present invention can also include materials known to be useful in preparing polyurethane/polyurea polymers by those skilled in the art. Included in these materials are additives such as fillers, mold release agents, pigments, blowing agents, surfactants, flame retardants and the like. Specifically excluded are other conductive fillers. The polymers of the present invention are not sufficiently conductive in the absence of the non-volatile metal salt conductivity inducing materials of the present invention to be efficiently electrostatically painted.

The formulation components of the formulations of the present invention can be brought together to form a polymer in any way known to be useful to those skilled in the art of preparing polyurethane/polyurea polymers. One preferred means of forming the polyurethane/polyurea polymers of the present invention is by means of reaction injection molding (RIM). Preparing RIM polymers is well known in the art, but generally includes the steps of introducing at least two streams of mutually reactive materials through a mixer into a mold wherein the materials polymerize to produce a molded polymer article.

In addition to the advantage of being paintable without the use of a conductive primer, the polymers of the present invention can be molded with fewer defects due to flash imperfections. Small particles of polymer which remain in the mold after a molded article has been removed from the mold are known as flash. Since the polymers of the present invention are comparatively more conductive than otherwise identical polymers prepared without conductivity inducing materials, they can be less subject to a static-attraction to the mold and can be more easily removed. Therefore, the flash particles are less likely to remain behind and be an imperfection on the surface of the next article to be molded.

In the practice of the present invention, cured polymers are electrostatically painted. For the purposes of the present invention, electrostatic painting includes at least the steps of: (1) charging an object to be painted with an electrical charge, (2) charging a paint with an electrical charge of opposite polarity to that of the object or at least grounding the paint relative to the charged article and; (3) dispensing the paint from an electrostatic painting apparatus onto the object. It is also possible and even more routine, in some industries, to charge the paint and ground the object to be painted. Any means and apparatus known to be useful for electrostatic painting to those skilled in the art can be used with the process of the present invention. For example, an apparatus such as a BINKS MODEL 85* can be used to electrostatically paint the cured polymers of the present invention (*BINKS MODEL 85 is a trade designation of Binks Manufacturing Company).

While the present invention can be used with liquid paints, it is not intended that the term "paint" be so narrowly construed. For purposes of the present invention, the material which can be "painted" onto an object by the method the present invention includes any material which can be electrostatically deposited onto an object. These materials include but are not limited to liquid pigment paints, liquid transparent paints (also known as clear coats), powder pigments, powder coatings, conductive coatings such as primers and prepcoats and the like. The materials can be neat or solvent born, water born or both solvent and water born. As with the case of powders, for example, the materials can also be applied as a solid. The process of electrostatic painting includes the process of electrodeposition as well wherein rather than applying the material onto the article in an aerosol, the article is dipped into the material while an electrostatic potential is maintained between the article and the material being applied thereto.

A preferred embodiment of the present invention is an electrostatically painted object comprising at least two layers, a first layer being a layer of polymer prepared from a polymer formulation including (1) materials which include or form urea groups, urethane groups or mixtures thereof, and (2) a non-volatile metal salt conductivity inducing material, and a second layer, the second layer being a layer of electrostatically applied paint, wherein (a) the polymer can be efficiently electrostatically painted, and (b) the polymer would not be conductive but for the inclusion of the non-volatile metal salt conductivity inducing materials in the polymer. While the present invention is useful for electrostatically painting articles not primed or coated with a conductive material, that is the two layers being adjacent, the present invention can also be used advantageously to prepare articles having a third layer interposed between the electrostatically applied paint and the polymer. The third layer can be a non-conductive or a conductive coating. The non-volatile metal salts of the present invention increase the bulk conductivity of polymers prepared therewith. Surface coating of a polymer with a conductive material increases surface conductivity but has little effect on bulk conductivity. It is believed that surface conductivity alone is inefficient in charging an article to be electrostatically painted. Therefore, the method of the present invention can be employed to more efficiently paint a polymer coated with a non-conductive layer or even a polymer having a preparatory conductive coating such as a conductive primer or prep-coat.

The method of the present invention can be advantageous compared to conventional methods of electrostatically painting polymers for several reasons. One of these reasons is that a very small amount of material is added to a polymer which both imparts sufficient conductivity to permit efficient electrostatic painting but does not substantially degrade polymer physical properties. The non-volatile metallic salts of the present invention can be selected such that they are compatible with the polymer formulation in which they will be included. Alternatively, the salt can be mixed with a compatibilizer. If a compatibilizer is used, it should be selected such that it does not impart undesirable properties to the polymer and that it does not degrade the physical properties of the polymer. For example, n-methyl-2-pyrrolidone can be used to compatibilize a non-volatile salt of the present invention and yet not cause a substantial degradation of polymer physical properties prepared therewith.

In addition to the other benefits of the present invention, the process of the present invention can be safer to use than conventional processes of electrostatically painting polymers. In some conventional painting processes, a conductively primed part is painted. Since there is primarily only surface conductivity on such a part, substantial energy must be used for painting. If the lead to the part becomes loose, the possibility for fire due to arcing of the lead to the part is substantial. The process of the present invention utilizes bulk conductivity which can lower the possibility for arcing and thus fires.

The following examples and comparative examples are meant to be illustrative of the present invention. These examples and comparative examples are not intended to limit the claims of the present inventions and they should not be so interpreted.

EXAMPLE 1

A polyurethane/polyurea polymer is prepared by reacting an isocyanate prepolymer (A side) and a polyol diamine mixture (B side) by means of a reaction injection molding apparatus to produce elastomer plaques measuring 17.5 in. (44.4 cm)×10.0 in. (25.4 cm)×0.063 in. (0.16 cm). The parameters of the reaction injection molding apparatus are displayed below in Table 1. The polyurethane/polyurea polymer formulation is of two components. The first component is a methylene diphenyl diisocyanate based soft segment prepolymer, the prepolymer being prepared with a polyether polyol sold commercially as SPECTRIM 50A* (*SPECTRIM 50A is a trade designation of The Dow Chemical Company). The second component is a blended active hydrogen containing component based on a polyether polyol and diethyltoluenediamine sold commercially as SPECTRIM 50B* (*SPECTRIM 50B is a trade designation of The Dow Chemical Company). "0.164 percent of total polymer weight of a sodium perfluroalkyl sulfonic acid salt is included in the SPECTRIM 50B component." the SPECTRIM 50B component and sodium perfluroalkyl sulfonic acid salt, FLOURED CF-98*, are mixed and placed into a reservoir of the RIM apparatus (*FLOURAD FC-98 is a trade designation of 3M and is a mixture of potassium perfluoro cyclohexyl alkylsulfonates). The SPECTRIM 50A prepolymer is also placed in a reservoir of the RIM apparatus. Plaques are prepared by molding and postcuring.

The plaques are washed using a five step process including the steps of a 60 second rinse in ISW 32*, a 30 second deionized water rinse, a 30 second rinse in ISW 33**, a 30 second deionized water rinse, a 15 second deionized water rinse (*ISW-32 is a trade designation of DuBois Chemicals Corp. and is a phosphoric acid based detergent; **ISW-33 is a trade designation of DuBois Chemicals Corp. and is a phosphoric acid based painting conditioning agent). The plaques are then dried.

The plaques are painted by first weighing the plaques on an analytical balance (Original Plaque Weight (OP Wt)) and then mounting the plaques on a curved metal support having an 8.6 inch (21.8 cm) radius. The support is then mounted on a conveyor traveling 320 inches/minute (8.13 m/minute). The distance through which the plaques are moved during painting is 20 inches (50.8 cm). The plaques are painted with a BINKS MODEL 85* gun having a 0.046 inch (1.24 mm) orifice equipped with an E63PB* air cap and a D63B* fluid tip (*BINKS MODEL 85, E63PB and D63B are trade designations of Binks Manufacturing Company). The optimum conditions to paint a metal coupon to 1.4 mil (0.036 mm) are 50 psi (345 mPa) air atomization pressure and 8 psi (55.2 mPa) cup pressure. The gun is indexed downward 3 inches (7.62 cm) for each of 6 passes per coat of paint. The applied voltage is 70 to 75 kilovolts at a current of 40 to 45 microamps. The paint used is PPG CBCS554* which is diluted with isobutyl acetate to produce a spray viscosity of 22 seconds using a Fisher #2 cup (PPG CBC8554 is a trade designation of PPG Industries, Inc.). After a first coat of paint is applied, the paint is allowed to flash for 1.5 minutes and then a second coat of paint is applied.

After the plaques are painted, the paint transfer efficiency is measured by allowing the painted plaques to flash for five minutes and then curing the plaques in a ventilated oven at 260° F. (127° C.) for 45 minutes. The plaques are allowed to cool for 30 minutes at ambient temperature and then reweighed on an analytical balance (Final Plaque Weight (FP Wt)). Throughput of the spray gun (TP) is determined by disabling the air stream and weighing the amount of paint collected in one minute. Weight percent solids in the paint (WT Solids) is determined by flashing the solvent from 5–10 grams of paint, curing at 120° C. for one hour and determining the difference in weight with a balance. Paint spray time (PST) is 44.4 seconds. Paint transfer efficiency is determined with the following formula:

$$\text{Paint Transfer Efficiency} = \frac{(\text{FP Wt}) - (\text{OP Wt})}{\text{TP} \times \text{PST} \times \text{Wt Solids}}$$

and displayed in Table 2 below.

COMPARATIVE EXAMPLE 2

A polyurethane/polyurea polymer is prepared, painted substantially identically to Example 1 except that instead of 0.164 percent FLUORAD FC-98, the formulation includes no FLUORAD FC-98. The result is displayed in Table 2 below.

TABLE 1

| Reaction Injection Molding Parameters | |
|---|---|
| Head Pressure (psi)/(mPa) | 1,900/13,100 |
| Throughput (g/sec.) | 400 |
| Reservoirs Temperature (° C.) | 38 |
| Mold Temperature (° C.) | 63 |
| Injection Time (sec.) | 0.85 |
| Demold Time (sec.) | 40 |

TABLE 2

| Example Number | FC-98* Concentration | Paint Transfer Efficiency |
|---|---|---|
| 1 | 0.164 | 13.47 |
| Comparative 2 | 0.000 | 9.47 |

*FC-98 is a trade designation of 3M and is a mixture of potassium perfluoro cyclohexyl alkylsulfonates.

EXAMPLE 3

A polyurethane/polyurea polymer is prepared and tested substantially identically to Example 1 except that instead of 1.164 percent FLUORAD FC-98, the formulation includes 0.761 percent FLUORAD FC-98. The plaques are tested for physical properties. The result is displayed below in Table 3.

EXAMPLE 4

A polyurethane/polyurea polymer is prepared and tested substantially identically to Example 3 except that instead of 0.761 percent FLUORAD FC-98, the formulation includes 0.200 percent FLUORAD FC-98. The result is displayed below in Table 3.

COMPARATIVE EXAMPLE 5

A polyurethane/polyurea polymer is prepared and tested substantially identically to Example 3 except that instead of 0.761 percent FLUORAD FC-98, the formulation includes no FLUORAD FC-98. The result is displayed in Table 3.

TABLE 3

| Example Number | 3 | 4 | Comp. 5 |
|---|---|---|---|
| FC-98* Concentration (percent) | 0.761 | 0.200 | 0.000 |
| Tensile Strength (psi)/mPa)[1] | 3,740/ 25,787 | 4,780/ 32,959 | 3,970/ 27,373 |
| Elongation (percent)[1] | 298 | 338 | 307 |
| Young's Modulus (psi)/mPa)[2] | 8,590/ 59,090 | no data | 7,680/ 52,594 |
| Flexural Modulus (psi)/mPa)[2] | 60,620/ 417,975 | 55,600/ 383,362 | 58,400/ 402,668 |
| Tear Strength (pli)/(kg/cm)[3] | 688/791 | 658/760 | 676/876 |
| Heat Sag 6 in (15.2 cm)[4] | 37.67 | 44.67 | 37.67 |
| Notched Izod (in-lbs)/g/cm)[5] | | | |
| ambient | 99.8/ 114,982 | 107.1/ 123,393 | 98.8/ 113,830 |
| −20° F. (−29° C.) | 23.7/ 27,305 | 95.2/ 4,558 | 94.8/ 4,539 |
| Hardness A ((psi)/mPa)[6] | 94.6/ 4,529 | 95.2/ 4,558 | 94.8/ 4,539 |

TABLE 3-continued

| Example Number | 3 | 4 | Comp. 5 |
|---|---|---|---|
| Water Absorption[7] | | | |
| 24 hours | 2.28 | no data | 2.51 |
| 240 hours | 4.17 | no data | 3.84 |

*FC-98 is a trade designation of 3M and is a mixture of potassium perfluoro cyclohexyl alkylsulfonates.
[1]ASTM-D-638-89, Test Method for Tensile Properties of Plastics
[2]ASTM-D-790-86, Test Methods for Flexural Properties of Unreinforced and Reinforced Plastics and Electrical Insulating Materials
[3]ASTM-D-624-86, Test Method for Rubber Property -- Tear Resistance
[4]ASTM-D-3796-85 Method of Testing Microcellular Urethanes -- High Temperature Sag
[5]ASTM-D-256-88, Test Methods for Impact Resistance of Plastics and Electrical Insulating Materials
[6]ASTM-D-2240-86, Test Method for Rubber Property -- Durometer Hardness
[7]ASTM-D-570-81, Test Method for Water Absorption of Plastics

EXAMPLES 6–18 AND COMPARATIVE EXAMPLES 19–24

Polymers are prepared with the non-volatile metal salts of the present invention. The additives detailed below in Table 4A–4C are admixed into the polymer formulations and then injection molded or reaction injection molded into articles suitable for painting. A white basecoat (CBC9753) is applied with a SPRAYMATION MODEL 310160* automatic panel sprayer. The fixed conditions for the panel spraying system are:

850"/minute (2.16 m/minute) gun traverse speed;

2"(5.2 cm) spray gun index with 50% fan overlap;

40 psig (276 kPa) air atomization pressure;

BINKS MODEL 80a* electrostatic spray gun including a 63B fluid tip, N63 air cap, and a 111-1271 fluid needle;

BINKS MODEL 111-3800*, 0–100 kilovolt power supply;

Gun to part distance 10"(25.4 cm);

Number of coats=2;

Number of gun passes per coat=8; and 80 kilovolt.

(BINKS MODEL 80A and BINKS MODEL 111-3800 are trade designations of Binks Manufacturing Company, SPRAYMATION MODEL 310160 is a trade designation of Spraymation Equipment Company)

The process conditions used during the application and the specific paint preparation conditions are shown below. Painted panels are cured after paint application in an electric air circulation oven. The paints used are Pittsburgh Paint and Glass (PPG)* paints. The paints had the following properties:

| Designation<br>Type | CBC9753*<br>WHITE |
|---|---|
| LOT NUMBER | 64233C |
| UNREDUCED VISCOSITY | 60 |
| SPRAY VISCOSITY | 21 |
| REDUCER | IBA |
| % REDUCER | 25 |
| NUMBER OF COATS | 2 |
| FLASH: COATS, MINUTES | 0.5 |
| FLASH BEFORE CURE - MINUTES | 5 |

-continued

| Designation<br>Type | CBC9753*<br>WHITE |
|---|---|
| CURE TIME - MINUTES 30 | 40 |
| CURE TEMPERATURE | 260° F. (127° C.) |

*PPG and CBC9753 are trade designations of Pittsburgh Paint and Glass

CALIBRATION:

Calibration is done on bare steel panels which are 0.032×4×12 inches (0.81 mm×10.2 cm×30.48) in size. The panels are painted without the electrostatics on for the calibration. The target film thickness for the steel calibration panel is 0.8 mils +/−0.1 mils (0.02+/−0.0025 mm). With few exceptions, the target film thickness is reached using a pot pressure of 6 PSIG.

PANEL HOLDER AND GROUNDING:

The standard metal panel support rods on the SPRAYMATION are replaced with fiberglass rods of the same dimensions. The rack cross-member are replaced with oak which is glued on with epoxy. Aluminum plates (2) that are 4×6×¼ inches (10.2×15.2×0.64 cm) in size are mounted 1 inch (2.54 cm) apart on the top oak cross-bar with wood screws. A metal bolt is flush mounted to the face of the metal plates. The bolt is centered on the plate and it protruded on the back where it serves as a grounding point. A grounding wire is attached with a nut and a washer. The ground has a resistivity of 0.15 ohms.

GROUND TESTING:

Ground testing is done with a WOODHEAD MODEL 7040* ground loop impedance tester (*WOODHEAD MODEL 7040 is a trade designation of Daniel Woodhead Company).

SAMPLE MOUNTING:

Test samples are mounted in such a way that half of the sample is backed by the grounded aluminum plate and half is unbacked. The test samples are held in place by clamping them on the outside edge (left handed part on the left side, right handed part on the right side) onto the aluminum plate with a conductive metal clip (≧0.15 ohms resistivity). This ensures that the plastic articles are grounded.

Since the aluminum plates are 4 inches (10.2 cm) wide by 6 inches (15.2 cm) long, the optimum part size is 4 (10.2 cm) inches wide by 12 inches (30.5 cm) long so that half of the part would be backed and half would not be backed. Some of the parts are 10 inches (25.4 cm) long, in which case, 5 inches (12.7 cm) of the parts are backed with the aluminum and 5 inches (12.7 cm) are not.

Many of the parts are only 5 inches (12.7 cm) long. In this case, 2 parts that are 5 inches (12.7 cm) long are clipped together to do the experiment. A 4 inch (10.2 cm) wide by 2.5 inch (6.4 cm) long by ¼ inch (0.64 cm) thick, non-conductively modified polyurethane plaque is taped, from the back, onto the aluminum plate. The metal clip used to hold the parts in place is centered over the interface between the aluminum plate and the polyurethane. Half of the clip is on each of the 5 inch (12.7 cm) long parts. Masking tape is used to cover any exposed aluminum.

FILM THICKNESS:

Film thickness is measured on the steel panels using an ELCOMETER 245* portable film thickness meter (*ELCOMETER 245 is a trade designation of Elcometer Instruments Ltd.). Film thickness is measured visually on the plastic panels. A piece of the painted substrate is dug out of the painted plastic substrate with a razor knife. The chip is placed painted side down on a flat cutting surface. A cross-section is cut through the plastic and paint layers. The cross sectional piece is placed on a microscope slide. The paint thickness is measured at a magnification of 200 times with a graduated ocular. On the 12 inch (30.5 cm) long panels, film thickness measurements are made at 2 (5.1 cm) and 4 (12.7) inches from the top of the aluminum backed half of the test panels. On the 5 inch (12.7 cm) long panels that are clipped together, and the 10 inch (25.4 cm) long panels, film thickness measurements are made at 1.5 (3.81 cm) inches from the top of the aluminum backed half of the test panel. They are measured at 3.5 inches (8.9 cm) below the metal backing on all samples.

PAINT WRAP:

Also measured is the extent to which the paint wraps around the part rather than just traveling in a straight line from the sprayer to the part being painted. This is a subjective measurement, known as paint wrap, made by comparing a sample to both an electrostatically painted steel control and a steel control similarly painted except that the electrostatic power supply is turned off during the painting. These parts have paint wrap values of excellent and none respectively. The hierarchy of paint wrap values are:

excellent>good>fair>>slight>none.

Results are recorded below in Tables 4A–4C.

TABLE 4A

| Example # | Polymer | Additive Type | Additive Amount | Film Build Backed | Film Build Unbacked | Paint Wrap |
|---|---|---|---|---|---|---|
| 6 | SPECTRIM 50S[A] | FC-98[B] | 0.10 | 1.3 mil 0.033 mm | 1.1 mil 0.027 mm | fair |
| 7 | SPECTRIM 50S[A] | FC-98[B] | 0.20 | 1.2 mil 0.030 mm | 1.0 mil 0.025 mm | good |
| 8 | SPECTRIM 50S[A] | FC-98[B] | 0.50 | 1.3 mil 0.033 mm | 1.2 mil 0.030 mm | excellent |
| 9 | SPECTRIM 50S[A] | FC-98[B] | 0.05 | 1.4 mil 0.036 mm | 0.9 mil 0.023 mm | slight |
| 10 | SPECTRIM 50S[A] | $KPF_6$ | 0.025 | 1.4 mil 0.036 mm | 0.9 mil 0.023 mm | slight |
| 11 | SPECTRIM 50S[A] | $KPF_6$ | 0.05 | 1.4 mil 0.036 mm | 1.1 mil 0.027 mm | slight |
| 12 | SPECTRIM 50S[A] | $KPF_6$ | 0.10 | 1.3 mil 0.033 mm | 1.1 mil 0.027 mm | good |

TABLE 4B

| Example # | Polymer | Additive Type | Additive Amount | Film Build Backed | Film Build Unbacked | Paint Wrap |
|---|---|---|---|---|---|---|
| 13 | SPECTRIM 50S[A] | $KPF_6$ | 0.13 | 1.4 mil 0.036 mm | 1.4 mil 0.036 mm | good |
| 14 | SPECTRIM 25[C] | FC-98[B] | 0.20 | 1.3 mil 0.033 mm | 1.2 mil 0.030 mm | good |
| 15 | SPECTRIM 25[C] | Sodium Tetrapheny l Boron | 0.20 | 1.2 mil 0.030 mm | 1.2 mil 0.030 mm | excellent |
| 16 | SPECTRIM 25[C] | Lithium trifluoro-methane-sulfonate | 0.20 | 1.2 mil 0.030 mm | 1.2 mil 0.030 mm | excellent |
| 17 | SPECTRIM HF85[D] | $KPF_6$ | 0.10 | 1.35 mil 0.034 mm | 0.95 mil 0.024 mm | good |
| 18 | TPU[E] | FC-98[B] | 1.0 | 1.5 mil 0.038 mm | 1.2 mil 0.030 mm | good |

TABLE 4C

| Example # | Polymer | Additive Type | Additive Amount | Film Build Backed | Film Build Unbacked | Paint Wrap |
|---|---|---|---|---|---|---|
| Comparative 19 | SPECTRIM 50S[A] | DEHYQUAT C[F] | 0.5 | 1.4 mil 0.036 mm | 0.60 mil 0.015 mm | slight |
| Comparative 20 | SPECTRIM HF85[D] | control | — | 1.2 mil 0.030 mm | 0.35 mil 0.009 mm | slight |
| Comparative 21 | SPECTRIM 25[C] | control | — | 1.1 mil 0.027 mm | 0.5 mil 0.013 mm | none |
| Comparative 22 | SPECTRIM 50S[A] | control | — | 1.0 mil 0.025 mm | 0.5 mil 0.013 mm | none |
| Comparative 23 | Steel | control | — | 1.3 mil 0.033 mm | 1.3 mil 0.033 mm | excellent |
| Comparative 24 | TPU[E] | control | — | 1.2 mil 0.030 mm | 0.5 mil 0.013 mm | slight |

TABLE 4C-continued

| Example # | Polymer | Additive Type | Additive Amount | Film Build Backed | Film Build Unbacked | Paint Wrap |
|---|---|---|---|---|---|---|

[A]SPECTRIM 50s is a polyurethane/polyurea polymer prepared by admixing two commercially available components (SPECTRIM 50S is a trade designation of The Dow Chemical Company). The first component is a methylene diphenyl diisocyanate based soft segment prepolymer, the prepolymer being the prepared with a polyether polyol sold commercially as SPECTRIM 50A* (*SPECTRIM 50A is a trade designation of The Dow Chemical Company). The second component is a blended active hydrogen containing component based on a polyether polyol and diethyltoluenediamine sold commercially as SPECTRIM 50B* (*SPECTRIM 50B is a trade designation of The Dow Chemical Company). The articles are prepared by reaction injection molding.
[B]FC-98 is a mixture of potassium perfluoro cyclohexyl alkylsulfonates available from 3M. FC-98 is a trade designation of 3M.
[C]SPECTRIM 25 is a polyurethane/polyurea polymer prepared by admixing two commercially available components (*SPECTRIM 25 is a trade designation of The Dow Chemical Company). The first component is a methylene diphenyl diisocyanate based soft segment prepolymer, the prepolymer being the prepared with a polyether polyol sold commercially as SPECTRIM 25A* (SPECTRIM 25A is a trade designation of The Dow Chemical Company). The second component is a blended active hydrogen containing component based on a polyether polyol and diethyltoluenediamine sold commercially as SPECTRIM 25B* (*SPECTRIM 25B is a trade designation of The Dow Chemical Company. The articles are prepared by reaction injection molding.
[D]SPECTRIM HF85 is a polyurethane/polyurea polymer prepared by admixing two commercially available components (*SPECTRIM HF85 is a trade designation of The Dow Chemical Company). The first component is a methylene diphenyl diisocyanate based soft segment prepolymer, the prepolymer being the prepared with a polyether polyol sold commercially as SPECTRIM HF85A* (*SPECTRIM HF85A is a trade designation of The Dow Chemical Company). The second component is a blended active hydrogen containing component based on an aminated polyether polyol sold commercially as SPECTRIM HF85FB* (*SPECTRIM HF85B is a trade designation of The Dow Chemical Company). The articles are prepared by reaction injection molding.
[E]TPU is a thermoplastic urethane based on methylene diphenyl diisocyanate and a polyester polyol sold commercially as PELLETHAHE 2354-65D (*2354-65D is a trade designation of The Dow Chemical Company). The additive was admixed into the liquid precursors used to prepare the TPU. The articles are prepared by injection molding.
[F]DEHYQUAT C is lauryl pyridinium chloride and is a trade designation of Henkel Corporation.

EXAMPLES 25, 27–29 AND COMPARATIVE EXAMPLES 26 & 30

Sample polyurethane/polyurea plaques are prepared using the polymers and non-volatile metal salts as shown in Table 5 (*SPECTRIM 50S is a trade designation of The Dow Chemical Company). The plaques are prepared by admixing the non-volatile metal salts with the B side of the formulation and then reaction injection molding the plaques. The samples are tested for physical properties and the results are displayed below in Table 6.

TABLE 6

| Example Number | 25 | Comparative 26 | 27 | 28 | 29 | Comparative 30 |
|---|---|---|---|---|---|---|
| Additive | Li-TF[4] | Control | FC-98[3] | FC-98[3] | $KPF_6$ | Control |
| Amount | 0.2 | — | 0.20 | 0.50 | 0.05 | — |
| Polymer | Spectrim 25[1] | Spectrim 25[1] | Spectrim 50S[2] | Spectrim 50S[2] | Spectrim 50S[2] | Spectrim 50S[2] |
| Flexural Modulus[A] psi/mPa | 26,470<br>182,504 | 27,400<br>188,916 | 60,860<br>419,615 | 59,450<br>409,893 | 62,760<br>432,715 | 58,670<br>404,515 |
| Specific Gravity[B] | 1.094 | 1.089 | 1.078 | 1.070 | 1.030 | 1.053 |
| Tear[C] pli/(kg/cm) | 475<br>546 | 451<br>518 | 607<br>698 | 605<br>695 | 591<br>679 | 585<br>672 |
| Tensile[D] Strength psi/mPa | 1,974<br>13,610 | 1,892<br>13,045 | 4,003<br>27,600 | 3,673<br>25,324 | 3,705<br>25,545 | 3,321<br>22,897 |
| Elongation percent | 288 | 292 | 235 | 242 | 219 | 213 |

[1]SPECTRIM 50S is a polyurethane/polyurea polymer prepared by admixing two commercially available components (SPECTRIM 50S is a trade designation of The Dow Chemical Company). The first component is a methylene diphenyl diisocyanate based soft segment prepolymer, the prepolymer being the prepared with a polyether polyol sold commercially as SPECTRIM 50A* (*SPECTRIM 50A is a trade designation of The Dow Chemical Company). The second component is a blended active hydrogen containing component based on a polyether polyol and diethyltoluenediamine sold commercially as SPECTRIM 50B* (*SPECTRIM 50B is a trade designation of The Dow Chemical Company). The articles are prepared by reaction injection molding.

TABLE 6-continued

| Example Number | 25 | Comparative 26 | 27 | 28 | 29 | Comparative 30 |
|---|---|---|---|---|---|---|

[2]SPECTRIM 25 is a polyurethane/polyurea polymer prepared by admixing two commercially available components (SPECTRIM 25A is a trade designation of The Dow Chemical Company). The first component is a methylene diphenyl diisocyanate based soft segment prepolymer, the prepolymer being prepared by with a polyether polyol sold commercially as SPECTRIM 25B (*SPECTRIM 25B is a trade designation of The Dow Chemical Company). The articles are prepared by reaction injection molding.
[3]FC-98 is a mixture of potassium perfluoro cyclohexyl alkylsulfonates available from 3M. FC-98 is a trade designation of 3M.
[4]Lithium trifluoromethanesulfonate.
[A]ASTM D-790-86, Test Methods for Flexural Properties of Unreinforced and Reinforced Plastics And Electrical Insulating Materials.
[B]ASTM D-792-86, Test Methods for Specific Gravity (Relative Density) and Density of Plastics by Displacement.
[C]ASTM-D-624-86, Test Method for Rubber Property -- Tear Resistance.
[D]ASTM-D-638-89, Test Method for Tensile Properties of Plastics.

EXAMPLE 31 AND COMPARATIVE EXAMPLES 32–36

Sample plaques are prepared with the polymers and additives indicated in Table 7 below. The plaques are powder coated using the following procedure:

POWDER COATING APPLICATION EQUIPMENT

A clear powder coating is applied electrostatically to test panels using a Nordson NPE CC8 Model 246152H* electrostatic Powder coating applicator. The applicator gun is mounted on an ECLIPSE MODEL 50-6528 panel sprayer using a rack speed of 300 inches/minute (762 cm/minute), a 10 inch (25.4 cm) gun to part distance, and a 3 inch (7.6 cm) gun index. The following conditions are kept constant on the powder applicator:

Atomizing air=20 PSIG (138 kPa);

Fluidizing 0.2 PSIG (1.4 kPa) input;

Flow rate 30 PSIG (207 kPa);

90 kilovolt electrostatic potential.

SAMPLE MOUNTING AND GROUNDING

The samples are mounted with a grounding clamp onto a corrugated cardboard holder which is made by taping 4, 12.5" L×1.75" W×0.125" inch (31.75 cm L×4.45 cm W×3.18 mm) pieces together. The holder is screwed onto the Eclipse support rod. The ground wire is attached at the top of the test parts.

POWDER COATING APPLICATION AND FORMULATION

The powder coating is applied in one coat and then cured for 15 minutes at 325° F. (163° C.).

The Powder coating formulation is composed of the following components by weight: DER 662UH* 100 parts, EPON P-108 4 parts, RESIFLOW P-67* 1 PART. (* DER 662UH is a trade designation of the Dow Chemical Company,  EPON P-108 is a trade designation of Shell Chemical Company, * RESIFLOW P-108 is a trade designation of Esrton Chemical Company).

The melt is mixed on a Buss Condux PLK-46 extruder with a kneader rate of 200 revolutions per minute at 70° F. (21° C.). The extrudate is ground into powder with a Mikropul Bantam grinder using a 0.013 inch herringbone screen. The powder is sieved through a 150 mesh screen.

TABLE 7

| Example Number | 31 | Comp. 32 | Comp. 33 | Comp. 34 | Comp. 35 | Comp. 36 |
|---|---|---|---|---|---|---|
| Additive | $KPF_6$ | control | FC-98[C] | FC-98[C] | FC-98[C] | control |
| Amount | 0.1 | — | 1.00 | 0.50 | 0.25 | — |
| Polymer | HF-85[A] | HF-85[A] | GTX[B] | GTX[B] | GTX[B] | GTX[B] |
| Powder Build grams | 5.63 | 2.51 | 0.93 | 1.02 | 0.91 | 1.15 |

[A]SPECTRIM HF85 is a polyurethane/polyurea polymer prepared by admixing two commercially available components (SPECTRIM HF85 is a trade designation of The Dow Chemical Company). The first component is a methylene diphenyl diisocyanate based soft segment prepolymer, the prepolymer being the prepared with a polyether polyol sold commercially as SPECTRIM HF85A* (*SPECTRIM HF85A is a trade designation of the The Dow Chemical Company). The second component is a blended active hydrogen containing component based on an aminated polyether polyol sold commercially as SPECTRIM HF85B* (*SPECTRIM HF85B is a trade designation of The Dow Chemical Company). The articles are prepared by reaction injection molding.
[B]GTX is NORYL GTX 910-A*, an engineering thermoplastic based on a polydimethylphenylene oxide and nylon blend available from General Electric Company (*NORYL GTX 910-A is a trade designation of General Electric Company). The additive is first admixed in high concentration with the plastic to form a concentrate. This concentrate is then admixed with virgin plastic in a ratio to achieve the indicated concentration. Articles are formed by injection molding.
[C]FC-98 is a mixture of potassium perfluoro cyclohexyl alkylsulfonates available from 3M. FC-98 is a trade designation of 3M.

What is claimed is:

1. An electrostatically painted object comprising at least two layers, a first layer being a layer of polymer prepared from a polymer formulation including (1) materials which include or form urea groups, urethane groups or mixtures thereof, and (2) a non-volatile metal salt conductivity inducing material, wherein the non-volatile metal salt excludes metal salts of thiocyanaes, and a second layer, the second layer being a layer of electrostatically applied paint, wherein (a) the polymer is efficiently electrostatically painted, and (b) the polymer is not conductive but for the inclusion of the non-volatile metal salt conductivity inducing materials in the polymer, wherein the polymer formulation does not include a conductivity enhancer.

2. The electrostatically painted object of claim 1 wherein the polymer has physical properties substantially the same as those of otherwise identical polymers prepared without non-volatile metal salt inducing material.

3. The electrostatically painted object of claim 1 wherein the non-volatile metal salt contains at least one cation selected from cations in the group consisting of Li, Na, K and mixtures thereof.

4. The electrostatically painted object of claim 3 wherein the non-volatile metal salt contains an anion selected from he group consisting of a perfluoroalkyl sulfonate, a tetraphenylboron anion, a hexafluorophosphate anion, and mixtures thereof.

5. The electrostatically painted object of claim 1 wherein the non-volatile metal salt is present in the polymer formulation at from about 0.02 to about 1.5 percent, by weight, based on the total polymer weight.

6. The electrostatically painted object of claim 1 wherein the electrostatically applied paint layer and the polymer layer are adjacent.

7. The electrostatically painted object of claim 1 wherein the object includes an additional layer interposed between the electrostatically applied paint layer and the polymer layer.

8. The electrostatically painted object of claim 7 wherein the additional layer is a conductive primer or conductive preparatory coating.

9. The electrostatically painted object of claim 1 wherein the polymer is an object formed by injection molding or reaction injection molding.

10. The electrostatically painted object of claim 9 wherein the polymer is an object formed by reaction injection molding.

11. The electrostatically painted object of claim 10 wherein the object is an automobile fascia, automobile interior panel, or an automobile exterior panel.

12. The electrostatically painted object of claim 4 wherein the non-volatile metal salt is potassium hexafluorophosphate.

* * * * *